(12) United States Patent
Tsai et al.

(10) Patent No.: US 10,885,929 B2
(45) Date of Patent: Jan. 5, 2021

(54) COMPUTER-AIDED CONVERSION SYSTEM AND METHOD FOR GENERATING INTELLIGIBLE SPEECH

(71) Applicant: TS Voice Technology, LLC, Oakland, CA (US)

(72) Inventors: Shu Wei Tsai, Oakland, CA (US); Hengchin Yeh, Oakland, CA (US); Tieh-Hung Chuang, Oakland, CA (US); Yi-Hsin Chen, Oakland, CA (US)

(73) Assignee: TS VOICE TECHNOLOGY, LLC, Oakland, CA (US)

( * ) Notice: Subject to any disclaimer, the term of this patent is extended or adjusted under 35 U.S.C. 154(b) by 202 days.

(21) Appl. No.: 16/250,645

(22) Filed: Jan. 17, 2019

(65) Prior Publication Data

US 2019/0244629 A1 Aug. 8, 2019

Related U.S. Application Data

(60) Provisional application No. 62/595,013, filed on Feb. 5, 2018.

(51) Int. Cl.
*G10L 21/06* (2013.01)
*G10L 21/0364* (2013.01)
(Continued)

(52) U.S. Cl.
CPC ........ *G10L 21/0364* (2013.01); *G10L 21/013* (2013.01); *G10L 21/02* (2013.01);
(Continued)

(58) Field of Classification Search
CPC ....... G10L 21/06; G10L 21/02; G10L 21/003; G10L 21/07; G10L 21/0364; G10L 21/14;
(Continued)

(56) References Cited

U.S. PATENT DOCUMENTS 5,828,758 A * 10/1998 Byce ..................... G09B 21/00
381/70
6,006,175 A * 12/1999 Holzrichter .......... A61B 5/0507
704/205

(Continued)

OTHER PUBLICATIONS

Tsai et al., The Phonetically Specific Oral Cavity Detection by Applying Programmed High Frequency Signal, Triological Combined Sections Meeting, Jan. 18, 2018, (See p. 5 and p. 91, Paragraph 53), Triological Society, Scottsdale, Arizona, USA, 139 pages.

*Primary Examiner* — Qi Han
(74) *Attorney, Agent, or Firm* — Muncy, Geissler, Olds & Lowe, P.C.

(57) ABSTRACT

The present invention provides a computer-aided conversion system and method for generating intelligible speech that uses a transmitter disposed in the nasal cavity of a user and a receiver disposed in pairs with the transmitter, the transmitter transmits a detecting signal in waveform to the nasal cavity of the user, and the receiver receives a reflected wave from the user's nasal cavity. After analyzing the reflected wave, a spectrum corresponding to the acoustic model of an articulatory cavity is obtained. Through the spectrum, the intention in the speaking of the user may be known, that is, the present invention may detect a speech not originated from the vocal cord of the user.

10 Claims, 7 Drawing Sheets

(51) Int. Cl.
    *G10L 21/013*     (2013.01)
    *G10L 21/02*     (2013.01)
    *G10L 25/30*     (2013.01)
    *G10L 15/16*     (2006.01)

(52) U.S. Cl.
    CPC .......... G10L 21/0202 (2013.01); G10L 25/30 (2013.01); *G10L 15/16* (2013.01); *G10L 2021/0135* (2013.01)

(58) Field of Classification Search
    CPC ......... G10L 21/16; G10L 21/18; G10L 25/30; G10L 25/27; G10L 25/48; G10L 25/51; G10L 25/60; G10L 25/72; G10L 25/75; G10L 25/78; G10L 2021/00; G10L 2021/003; G10L 2021/0135; G10L 2021/02; G10L 2021/0364; G10L 2021/06; G10L 2021/065
    USPC ........ 704/3, 1, 2, 7, 10, 232, 233, 236, 243, 704/250, 271, 272
    See application file for complete search history.

(56) References Cited

U.S. PATENT DOCUMENTS

| | | | |
|---|---|---|---|
| 9,143,106 B1* | 9/2015 | Grocela | G10L 13/04 |
| 2012/0150544 A1* | 6/2012 | McLoughlin | G10L 21/0364 704/262 |

* cited by examiner

COMPUTER-AIDED CONVERSION SYSTEM AND METHOD FOR GENERATING INTELLIGIBLE SPEECH

FIELD OF THE INVENTION

The present invention relates to a computer-aided conversion system and method for generating intelligible speech, and more particularly to a computer-aided conversion system and method for generating intelligible speeches made by patients whose vocal cord cannot vocalize.

BACKGROUND OF THE INVENTION

Laryngeal cancer is a common cause of dysfunction of vocalization. Patients having laryngeal cancer lose their natural ability to vocalize after undergoing a total laryngectomy. In order to overcome the troubles with the vocalization of such patients, one of the previous solutions provides detecting electrodes on the surfaces of the patient's head and neck to detect the intention in the speaking of the patient according to changes in the head and the neck. Another solution, the technique of permanent-magnetic articulography, is to connect magnets to the patient's tongue and lips and infer the patient's speech by learning the patient's intraoral motion according to changes of the magnetic field. Besides, Microsoft has also provided a Kinect-based computer-vision device that uses depth cameras to interpret the lip language of patients to achieve the purpose of aiding speech.

However, although the aforementioned detection methods are effective to some extent, the accuracy of the detection is difficult to be improved. Furthermore, there are too many sensors to be placed for methods such as disposing electrodes on the face or the permanent-magnetic articulography, the data processing speed is slow, and the detection devices are difficult to be realized in the portable form. Moreover, as for the detection method provided by Microsoft, if the user leaves the visible range of the depth camera, the interpretive function will be lost, which limits the possibility of production. Therefore, how to overcome the drawbacks of the previous technology is an important issue.

SUMMARY OF THE INVENTION

An object of the present invention is to solve the problems in the prior art of slow response and many limitations in using the aided vocalization techniques for generating speech of patients with dysfunction.

To achieve the above object, the present invention provides a computer-aided conversion system for generating intelligible speech that is not originated from a vocal cord of a user. The computer-aided conversion system for generating intelligible speech comprises a detection unit and a computation unit. The detection unit comprises a transmitter disposed corresponding to the nasal cavity of the user, and a receiver disposed in pairs with the transmitter. The computation unit comprises a transmitting-computing module to generate a detecting signal and transmit the detecting signal to the transmitter, and a receiving-computing module to analyze a reflected signal received by the receiver. Wherein the transmitter transmits the detecting signal in a waveform to the nasal cavity of the user, the receiver receives a reflected wave from the nasal cavity of the user and converts the reflected wave into the reflected signal, the receiving-computing module obtains a spectrum corresponding to the acoustic model of an articulatory cavity based on the reflected signal, and the spectrum corresponds to a speech not originated from the vocal cord of the user.

Further, the transmitter is disposed in a nasal-oro-pharyngo-laryngeal tract of the user, and the receiver is disposed at a position within 3 cm in front of the lips of the user.

Further, the detection unit comprises a cushion disposed on the transmitter, and a material of the cushion is biocompatible silicone rubber.

Further, the detecting signal is configured as an ultrasonic wave of 16 to 22 KHz.

Further, the computer-aided conversion system for generating intelligible speech further comprises a representation unit, the representation unit comprises a database storing acoustic information corresponding to the spectrum, and a player audibly or visually representing a speech not originated from the vocal cord of the user.

Further, another object of the present invention is to provide a computer-aided conversion method for generating intelligible speech used for obtaining a speech not originated from a vocal cord of a user. The method comprises the following steps of: step S1: transmitting a detecting signal to the nasal cavity of the user, wherein the detecting signal is transmitted in a waveform; step S2: receiving the detecting signal reflected in the nasal cavity of the user, and defining the reflected wave as a reflected signal; step S3: analyzing the reflected signal to generating a spectrum corresponding to the acoustic model of an articulatory cavity; and step S4: generating a speech not originated from the vocal cord of the user based on the spectrum.

Further, before the step S1, further comprising the following steps of: step S01: waiting for a start command; step S02: searching for a calibration parameter corresponding to the user based on the start command; and step S03: determining the detecting signal based on the calibration parameter.

Further, the reflected signal is converted into the spectrum corresponding to the acoustic model of the articulatory cavity by Fourier transform.

Further, the step S3 comprises the following steps of: step S31: intermittently sampling the reflected signal after Fourier transform; step S32: executing an adaptive controller to obtain a characteristic information based on the reflected signal after the Fourier transform; and step S33: generating the spectrum based on the characteristic information of the reflected signal after the Fourier transform.

Further, the adaptive controller is an artificial neural network, and the characteristic information is a Mel-frequency cepstrum (MFC) obtained after the reflected signal transformed by the Fourier transform is mapped to the Mel scale.

Therefore, the present invention obtains the spectrum by examining the spatial relationship of wave propagation in a specific phonetically oral cavity shape of the user, and the accuracy of distinguishing the vowels, consonants, syllables and their combinations is higher than 81.8%, overcoming the drawback of low interpretation accuracy in the prior art. The technical content of the present invention can achieve the object of computer-aided conversion for generating intelligible speech. In addition, the invention has the advantages of simple structure, real-time operation and interpretation due to low complexity of the signals, a small number of sensors, light weight and compact size, and the drawback of difficulty in production of the prior art is improved.

DETAILED DESCRIPTION OF THE PREFERRED EMBODIMENTS

Figure 1:
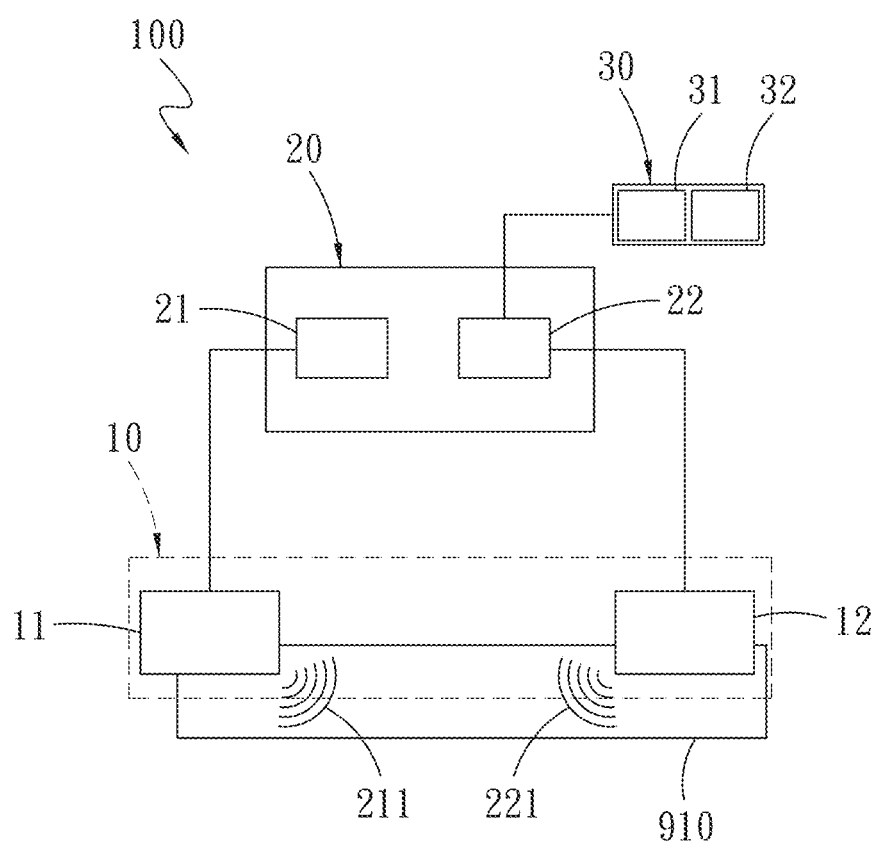
FIG. 1 is a functional block diagram of a computer-aided conversion system for generating intelligible speech of the present invention.

Please refer to FIG. 1 regarding the technique of the present invention. The present invention provides a computer-aided conversion system 100 for generating intelligible speech, which is used to obtain a speech not generated from the vocal cord of a user 900. In the present invention, the phrase "speech not originated from the vocal cord of the user 900" means that the user 900 cannot perfectly speak as a normal person due to factors such as throat disease or injury, but when the user 900 attempts to speak, the tension and the relaxation of various parts of the nasal cavity and oral cavity are changed due to the intention of speaking, and the present invention could reversely infer the original intention in the speaking of the user 900 by detecting such changes.

Figure 2:
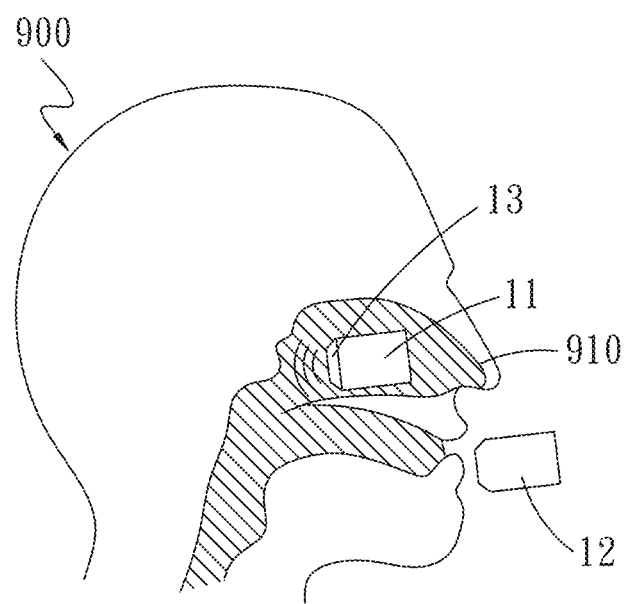
FIG. 2 is a cross-sectional view of a transmitter and a receiver of the present invention worn on a user.

Please refer to FIG. 1 and FIG. 2. The computer-aided conversion system 100 for generating intelligible speech comprises a detection unit 10 and a computation unit 20. The detection unit 10 comprises a transmitter 11 disposed corresponding to the nasal cavity of the user 900, and a receiver 12 disposed in pairs with the transmitter 11. The article "a" in the phrases "a transmitter 11" and "a receiver 12" of the present invention is not used to limit the quantity, one or more of the transmitter 11 and/or the receiver 12 are equally within the scope of the present invention. In one embodiment, the transmitter 11 is disposed in a nasal-oro-pharyngo-laryngeal tract 910 of the user 900, and the receiver 12 is disposed at a position within 3 cm in front of the lips of the user 900. In addition, the detection unit 10 preferably comprises a cushion 13 disposed on the transmitter 11, and a material of the cushion 13 is biocompatible silicone rubber for fixing the position of the transmitter 11 in the nasal cavity of the user 900, and for alleviating the sensation of having a foreign body in the nasal cavity when the user 900 wears the transmitter 11.

The computation unit 20 comprises a transmitting-computing module 21 to generate a detecting signal 211 and transmit the detecting signal 211 to the transmitter 11, and a receiving-computing module 22 to analyze a reflected signal 221 received by the receiver 12. The transmitter 11 transmits the detecting signal 211 in waveform (such as sound wave, electromagnetic wave, visible or invisible light wave, etc.) to the nasal cavity of the user 900. The receiver 12 receives a reflected wave originating from the nasal cavity of the user 900 and converts the reflected wave into the reflected signal 221. Then, the receiving-computing module 22 obtains a spectrum corresponding to the acoustic model of an articulatory cavity based on the reflected signal 221. The phrase "articulatory cavity shape" used in the present invention refers to the cavity shape formed by the combination of the oral cavity and nasal cavity (e.g., the spatial positional relationship between the velar and the nasal-oro-pharyngo-laryngeal tract 910) when the user 900 attempts to speak. It has been experimentally found that when humans pronounce a word, the same vowel, consonant or syllable, the articulatory cavity shape is uniform. The spectrum is a sound pressure-frequency spectrum obtained by collecting the reflected signal 221 after the Fourier transform in a specific articulatory cavity shape. It is understood that the spectrum is highly correlated with the speaking intention of the user 900.

In addition, the computer-aided conversion system 100 for generating intelligible speech can further comprise a representation unit 30. The representation unit 30 comprises a database 31 storing acoustic information corresponding to the spectrum, and a player 32 audibly or visually indicating a speech not originated from the vocal cord of the user 900. The database 31 may pre-record a plurality of recordings or texts corresponding to the spectrum, and the player 32 broadcasts the corresponding sound recordings or texts in the form of sound or text. However, the above forms of expression are merely illustrative and are not intended to limit the scope of the invention.

Figure 5:
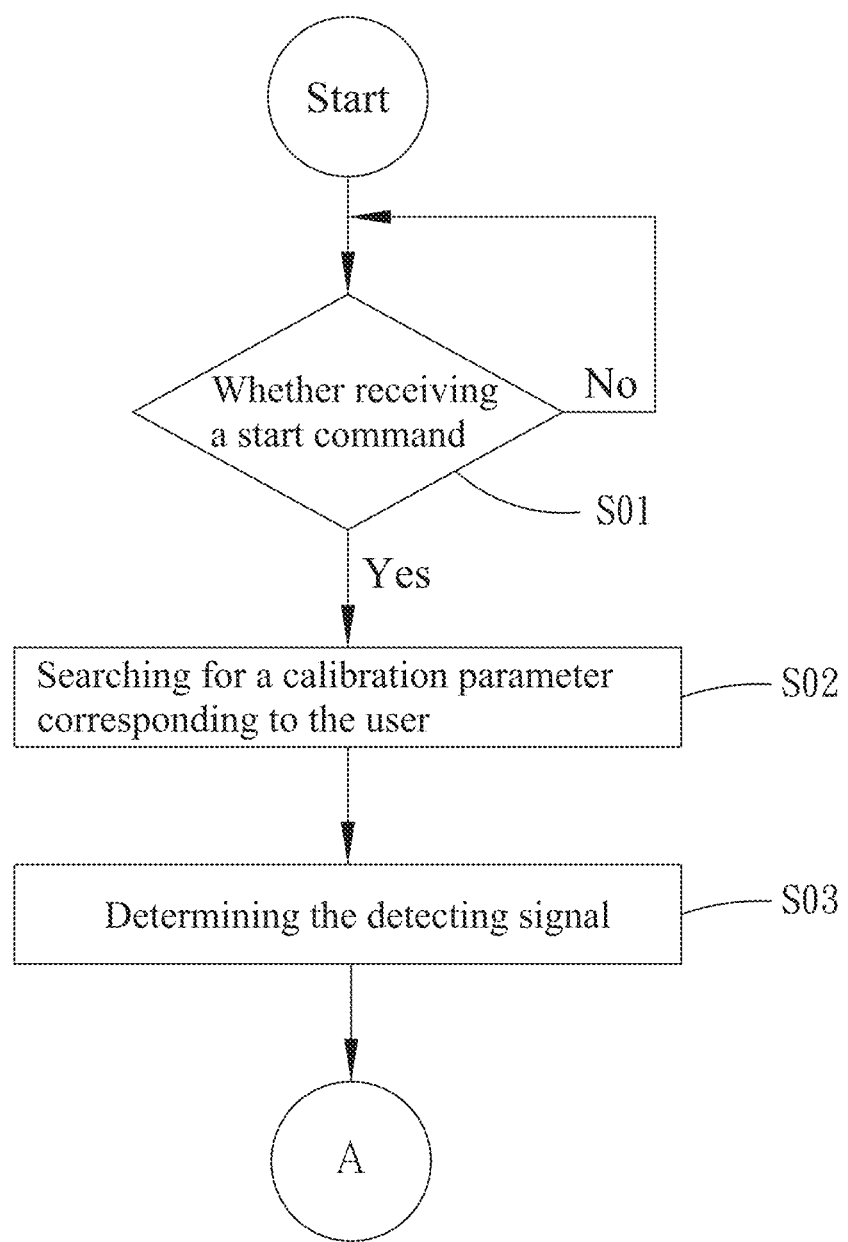
FIG. 5 and FIG. 6 are flow charts of a method of the present invention.
Figure 6:
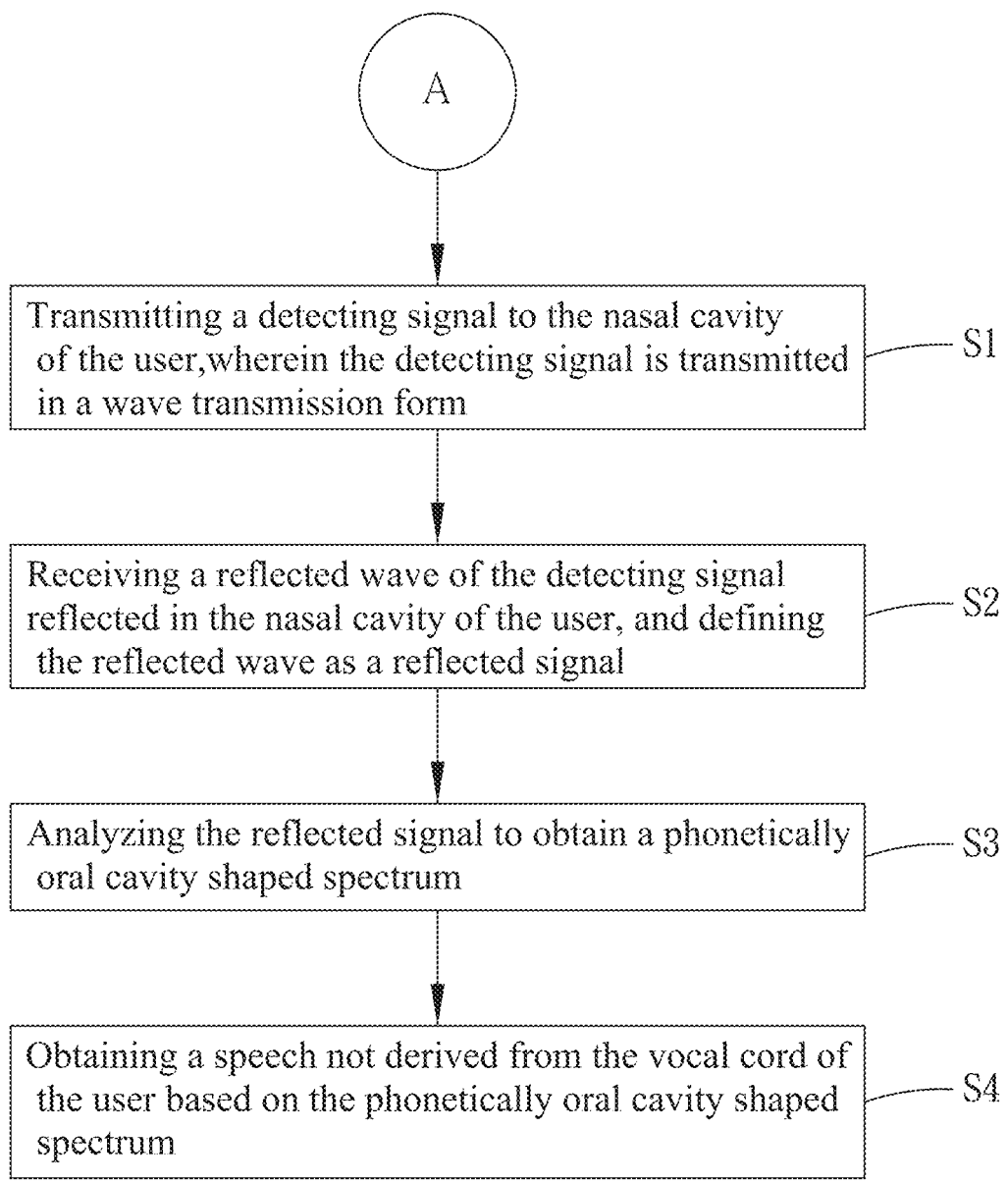

Referring to FIG. 5 and FIG. 6, the following describes a computer-aided conversion method for generating intelligible speech of the present invention.

Since the articulatory cavity shape corresponding to each user 900 has its specificity, it is optional to establish a separate parameter library for each of the user 900 before performing the method of the present invention, so that the system can retrieve different parameter libraries according to different users 900. Firstly, step S01 is performed: waiting for a start command. The start command can be triggered by the user 900 or determined by the computer-aided conversion system 100, and is not limited herein. Then, Step S02 is performed: searching for a calibration parameter corresponding to the user 900 based on the start command. The calibration parameter is stored in the aforementioned parameter library, and the parameter content is established based on measuring the spectrum of the user 900 multiple times. Then, step S03 is performed: determining the detecting signal 211 based on the calibration parameter. The above steps are the initial steps of the method of the present invention. In actual operation, the steps should be recurred continuously within a period of time to successively detect the speaking intention of the user 900. The specific operation flow after receiving the start command by using the method of the present invention is described hereunder.

Step S1: transmitting a detecting signal 211 to the nasal cavity of the user 900, wherein the detecting signal 211 is transmitted in the waveform. In this embodiment, the detecting signal 211 is preferably configured as an ultrasonic wave of 16 to 22 KHz, and the range of the ultrasonic wave is the frequency range with higher accuracy of judgment after the experiments.

Step S2: receiving a reflected wave of the detecting signal 211 reflected in the nasal cavity of the user 900, and defining the reflected wave as a reflected signal 221. It should be noted that the main objective of the present invention is to obtain the result of spatial reflection of the detecting signal 211 in a specific articulatory cavity shape. Therefore, as long as the spatial variation in the oral cavity and nasal cavity of the user 900 may be detected by transmitting the detecting signal 211, the object of the present invention can still be achieved even if replacing the detecting signal 211 with a different waveform such as a light wave or an electromagnetic wave.

Step S3: analyzing the reflected signal 221 to obtain a spectrum corresponding to the acoustic model of an articulatory cavity. In this embodiment, the reflected signal 221 is excerpted by a recording and analysis software Audacity®, and the spectrum is converted by Fast Fourier Transform (FFT). Since the spectrum of different testees may be slightly different, in order to improve accuracy, a testee can perform several specific articulatory cavity shapes several times in advance, and deep neural networks (DNN) with the counter-propagation algorithm are used to establish comparison data between the pronunciations of the testee and the spectrum (i.e., the aforementioned parameter library).

Step S4: obtaining a speech not originated from the vocal cord of the user 900 based on the spectrum. The following embodiments further explain the operation and effects of the present invention.

Embodiment 1

Figure 3:
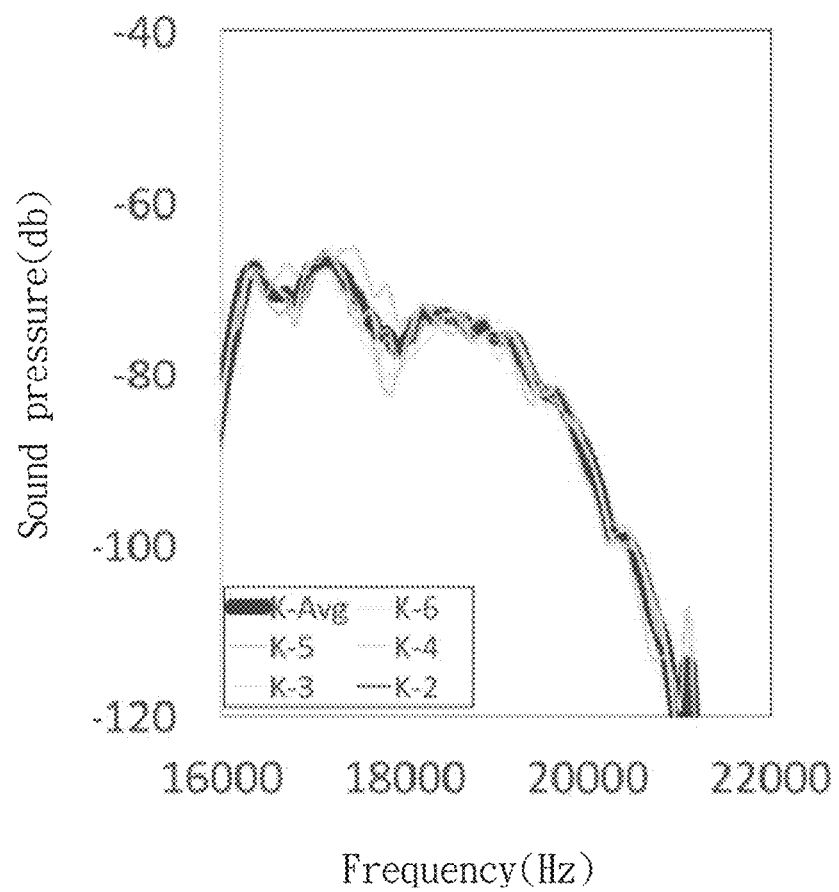
FIG. 3 is a graph of a spectrum corresponding to the acoustic model of an articulatory cavity of the present invention corresponding to a pronunciation of "K" by a user.

Please refer to FIG. 3. In this embodiment, the user 900 is asked to pronounce a "K" sound so that the oral and nasal cavities form an articulatory cavity shape corresponding to the pronunciation "K". Average values (i.e., the thicker line K-Avg in the figure) are obtained after collecting the spectrum multiple times. After using deep neural networks for the counter-propagation algorithm and comparing with the data in the parameter library, it can be known whether the user 900 intends to pronounce "K" sound.

Embodiment 2

Figure 4:
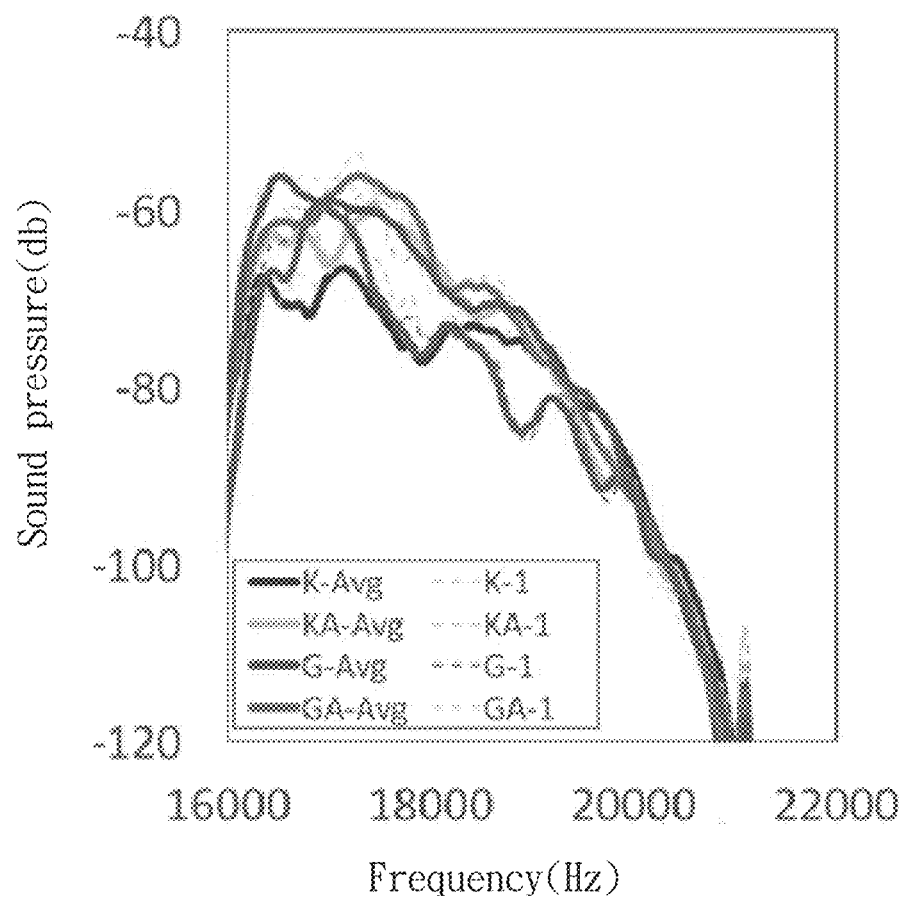
FIG. 4 is a graph of a spectrum corresponding to the acoustic model of an articulatory cavity of the present invention corresponding to pronunciations of "K", "KA", "G", and "GA" by the user.

Please refer to FIG. 4. In this embodiment, the user 900 is first requested to pronounce sounds of "K", "KA", "G", "GA", so that the oral and nasal cavities form an articulatory cavity shape corresponding to the above-mentioned pronunciations. Average values of the four pronunciations are obtained after collecting the spectrum multiple times. Then, the average values are calculated and compared by using deep neural networks to determine whether the pronunciation intention of the user 900 matches the detection result.

Embodiment 3

In this embodiment, the user 900 is asked to individually pronounce various vowels and consonants, and a combined pronunciation of continuous syllables of the vowels and consonants. After repeated experiments, the results of the implementation are shown in table 1 below.

TABLE 1

Comparison table of deep neural networks classification and phonematic accuracy of the present invention.

| Deep neural networks classification | Phoneme | Accuracy |
|---|---|---|
| Vowel | a, e, i, o, u | 99.7% |
| Consonant | P, t, l, s, k | 90.3% |
| Syllable | pa, ta, la, sa, ka | 92.6% |
| Consonant + syllable | P, t, l, s, k, pa, ta, la, sa, ka | 81.8% |
| Vowel + consonant + syllable | a, e, i, o, u, p, t, l, s, k, pa, ta, la, sa, ka | 85.3% |

According to table 1, the present invention obtains the spectrum by measuring the spatial relationship of wave propagation in a specific articulatory cavity shape of the user 900, and the accuracy of distinguishing the vowels, consonants, syllables and their mixed liaisons is higher than 81.8%. Thus, it is highly reliable to interpret the speaking intention of the user 900 with speech dysfunction based on the changes of the articulatory cavity shape of the user 900. The person who has the ordinarily skilled in the art can also foresee that, based on the technical content of the present invention, the object of comprehensive computer-aided conversion for generating intelligible speech can be realized after developing and establishing a spectrum corresponding to the acoustic model of the articulatory cavity database 31 through repeated experiments.

Figure 7:
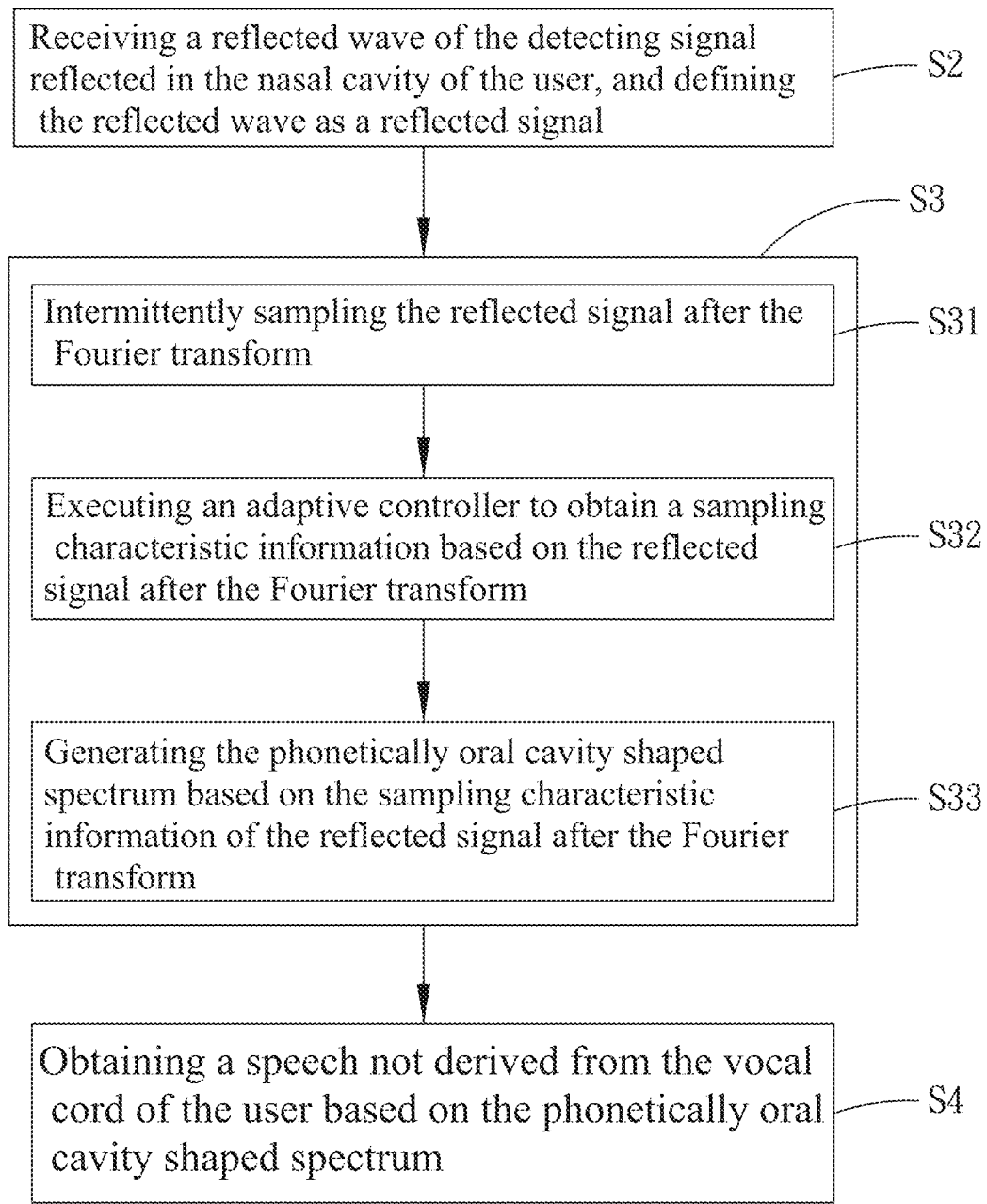
FIG. 7 is a flow chart of a detailed method of step S3 of the present invention.

Please refer to FIG. 7. In this embodiment, the step S3 comprises the following steps of: step S31: intermittently sampling the reflected signal 221 after the Fourier transform. Considering the average human speech rate, the sampling interval can be set to 50 milliseconds, which may stably reflect the user's 900 articulatory cavity shape, but the sampling interval is not limited to it. Then step S32: executing an adaptive controller to obtain characteristic information based on the reflected signal 221 after the Fourier transform. In this embodiment, the adaptive controller may be an artificial neural network (ANN) or the like, and the characteristic information is a Mel-frequency cepstrum (MFC) obtained after the reflected signal 221 transformed by the Fourier transform is mapped to the Mel scale, in order to facilitate the adaptive controller to obtain the characteristics of the user's 900 articulatory cavity shape by mechanical learning. Finally, step S33 is performed: generating the spectrum based on the characteristic information of the reflected signal 221 after the Fourier transform. Therefore, the present invention can use the form of the articulatory cavity shape when the user 900 attempts to speak, in order to determine the true intention in the speaking of the user 900.

What is claimed is:

1. A computer-aided conversion system for generating intelligible speech used for obtaining a speech not originated from a vocal cord of a user, the computer-aided conversion system for generating intelligible speech comprising:

a detection unit, comprising a transmitter disposed corresponding to the nasal cavity of the user, and a receiver disposed in pairs with the transmitter; and an computation unit, comprising a transmitting-computing module to generate a detecting signal and transmit the detecting signal to the transmitter, and a receiving-computing module to analyze a reflected signal received by the receiver, wherein the transmitter transmits the detecting signal in a waveform to the nasal cavity of the user, the receiver receives a reflected wave originating from the nasal cavity of the user and converts the reflected wave into the reflected signal, the receiving-computing module obtains a spectrum corresponding to an acoustic model of an articulatory cavity based on the reflected signal, and the spectrum corresponds to a speech not originated from the vocal cord of the user.

2. The computer-aided conversion system for generating intelligible speech as claimed in claim 1, wherein the transmitter is disposed in a nasal-oro-pharyngo-laryngeal tract of the user, and the receiver is disposed at a position within 3 cm in front of lips of the user.

3. The computer-aided conversion system for generating intelligible speech as claimed in claim 1, wherein the detection unit comprises a cushion disposed on the transmitter.

4. The computer-aided conversion system for generating intelligible speech as claimed in claim 1, wherein the detecting signal is configured as an ultrasonic wave of 16 to 22 KHz.

5. The computer-aided conversion system for generating intelligible speech as claimed in claim 1, further comprising a representation unit, the representation unit comprising a database storing acoustic information corresponding to the spectrum, and a player audibly or visually indicating a speech not originated from the vocal cord of the user.

6. A computer-aided conversion method for generating intelligible speech used for obtaining a speech not originated from a vocal cord of a user, the method comprising following steps of:
   step S1: transmitting a detecting signal to the nasal cavity of the user, wherein the detecting signal is transmitted in a waveform;
   step S2: receiving a reflected wave of the detecting signal reflected in the nasal cavity of the user, and defining the reflected wave as a reflected signal;
   step S3: analyzing the reflected signal to obtain a spectrum corresponding to an acoustic model of an articulatory cavity; and
   step S4: obtaining a speech not originated from the vocal cord of the user based on the spectrum.

7. The computer-aided conversion method for generating intelligible speech as claimed in claim 6, wherein the reflected signal is converted into the spectrum by Fourier transform.

8. The computer-aided conversion method for generating intelligible speech as claimed in claim 7, wherein the step S3 comprises the following steps of:
   step S31: intermittently sampling the reflected signal after the Fourier transform;
   step S32: executing an adaptive controller to obtain a characteristic information based on the reflected signal after the Fourier transform; and
   step S33: generating the spectrum based on the characteristic information of the reflected signal after the Fourier transform.

9. The computer-aided conversion method for generating intelligible speech as claimed in claim 8, wherein the adaptive controller is an artificial neural network, and the characteristic information is a Mel-frequency cepstrum obtained after the reflected signal transformed by the Fourier transform is mapped to a Mel scale.

10. The computer-aided conversion method for generating intelligible speech as claimed in claim 6, wherein before the step S1, further comprising the following steps of:
    step S01: waiting for a start command;
    step S02: searching for a calibration parameter corresponding to the user based on the start command; and
    step S03: determining the detecting signal based on the calibration parameter.

* * * * *